United States Patent
Vermeiren

(10) Patent No.: US 11,549,062 B2
(45) Date of Patent: Jan. 10, 2023

(54) RENEWABLE DIESEL FUEL PRODUCTION IN RETROFITTED FOSSIL PETROLEUM REFINERY TO PRODUCE BIOFUEL AND BIO-FEEDSTOCK FOR STEAM CRACKERS

(71) Applicant: Total Research & Technology Feluy, Seneffe (BE)

(72) Inventor: Walter Vermeiren, Houthalen (BE)

(73) Assignee: Total Research & Technology Feluy, Seneffe (BE)

( * ) Notice: Subject to any disclaimer, the term of this patent is extended or adjusted under 35 U.S.C. 154(b) by 0 days.

(21) Appl. No.: 17/059,581

(22) PCT Filed: May 28, 2019

(86) PCT No.: PCT/EP2019/063843
§ 371 (c)(1),
(2) Date: Nov. 30, 2020

(87) PCT Pub. No.: WO2019/229072
PCT Pub. Date: Dec. 5, 2019

(65) Prior Publication Data
US 2021/0207038 A1    Jul. 8, 2021

(30) Foreign Application Priority Data

May 30, 2018 (EP) .................................... 18175268

(51) Int. Cl.
*C10G 3/00* (2006.01)
*C10G 69/06* (2006.01)
(Continued)

(52) U.S. Cl.
CPC ............ *C10G 3/54* (2013.01); *B01J 19/0013* (2013.01); *B01J 19/245* (2013.01); *C10G 3/52* (2013.01);
(Continued)

(58) Field of Classification Search
None
See application file for complete search history.

(56) References Cited

U.S. PATENT DOCUMENTS

| 6,337,059 B1 | 1/2002 | Schubert et al. |
| 2004/0230085 A1 | 11/2004 | Jakkula et al. |
(Continued)

FOREIGN PATENT DOCUMENTS

| WO | 2011012438 A1 | 2/2011 |
| WO | 2011012439 A1 | 2/2011 |
(Continued)

OTHER PUBLICATIONS

International Search Report issued in Application No. PCT/EP2019/063843, dated Aug. 2, 2019; 3 pages.

*Primary Examiner* — Philip Y Louie
(74) *Attorney, Agent, or Firm* — Albert Shung

(57) ABSTRACT

The present invention relates to a process for the conversion of a feedstock comprising at least 50 wt % related to the total weight of the feedstock of triglycerides, fatty acid esters and/or fatty acids having at least 10 carbon atoms into hydrogen, olefins, dienes, aromatics, gasoline, diesel fuel, jet fuel, naphtha and liquefied petroleum gas comprising:
  a) introducing of said feedstock in a first reactor to produce linear paraffins in presence of a hydrodesulfurization catalyst and hydrogen,
  b) separating the effluent of said first reactor in at least three parts to produce at least a first stream comprising part of said linear paraffins and at least a second stream comprising part of said linear paraffins, and at least a third stream comprising part of said linear paraffins
  c) sending said first stream to a steam cracker to produce hydrogen, olefins, dienes, aromatics and gasoline, diesel fuel being further fractionated;
(Continued)

d) introducing said second stream into a second reactor in presence of a hydrocracking or hydroisomerization catalyst to produce a mixture comprising diesel fuel, jet fuel, naphtha and liquefied petroleum gas being further fractionated e) blending said third stream with the diesel fuel obtained at said step d)

wherein said feedstock of said first reactor is diluted in order to limit the temperature increase within said first reactor; and wherein before entering the first reactor said dilution is performed with a weight ratio diluent:feedstock being 1:1, and wherein said diluent comprises at least part of said paraffins obtained at step b).

14 Claims, 3 Drawing Sheets

(51) Int. Cl.
| | | |
|---|---|---|
| C11C 1/04 | (2006.01) | |
| C11C 1/08 | (2006.01) | |
| B01J 19/00 | (2006.01) | |
| B01J 19/24 | (2006.01) | |
| C11C 1/10 | (2006.01) | |

(52) U.S. Cl.
CPC ............... *C10G 3/60* (2013.01); *C10G 69/06* (2013.01); *C11C 1/04* (2013.01); *C11C 1/08* (2013.01); *C11C 1/10* (2013.01); *B01J 2219/0004* (2013.01); *B01J 2219/00038* (2013.01); *B01J 2219/00159* (2013.01); *C10G 2300/1011* (2013.01); *C10G 2300/202* (2013.01); *C10G 2300/4006* (2013.01); *C10G 2300/4056* (2013.01); *C10G 2400/02* (2013.01); *C10G 2400/04* (2013.01); *C10G 2400/08* (2013.01); *C10G 2400/20* (2013.01); *C10G 2400/22* (2013.01); *C10G 2400/26* (2013.01); *C10G 2400/30* (2013.01)

(56) References Cited

U.S. PATENT DOCUMENTS

| 2011/0319683 | A1 | 12/2011 | Abhari et al. | |
|---|---|---|---|---|
| 2012/0142983 | A1* | 6/2012 | Vermeiren | C10G 3/50 |
| | | | | 585/614 |
| 2017/0298280 | A1 | 10/2017 | Vermeiren et al. | |

FOREIGN PATENT DOCUMENTS

| WO | 2014033762 A1 | 3/2014 |
|---|---|---|
| WO | 2015128045 A1 | 9/2015 |

* cited by examiner

RENEWABLE DIESEL FUEL PRODUCTION IN RETROFITTED FOSSIL PETROLEUM REFINERY TO PRODUCE BIOFUEL AND BIO-FEEDSTOCK FOR STEAM CRACKERS

CROSS-REFERENCE TO RELATED APPLICATIONS

This application claims the benefit of PCT/EP2019/063843 filed May 28, 2019, which claims priority from EP 18175268.4 filed May 30, 2018, which is incorporated herein by reference in its entirety for all purposes.

TECHNICAL FIELD

The present invention relates to the production of transportation fuels and base chemicals (light olefins, dienes and aromatics) and hydrogen from natural resources. In particular, the present invention relates to a process for the conversion of bio-feedstock comprising fatty acid esters (FAE) or fatty acids (FA) into hydrogen, bio-olefins, bio-dienes, bio-aromatics, bio-gasoline, bio-LPG, bio-naphtha, bio-jet fuel and bio-diesel fuel.

BACKGROUND OF THE INVENTION

Authorities are mandating the use of biofuels in transportation fuels, while brand owners are demanding for conventional plastics, but made from renewable resources, pointing to the need for drop-in monomers like ethylene, propylene, butadiene and aromatics for making polymers. Most natural resources contain significant amounts of oxygen that is only accepted to a certain concentration in fuels and steamcracker feed. Hence, it is recommended to remove the oxygen from the natural resources before use in fuel blending or steam crackers. Using triglycerides, fatty acid esters or fatty acids as natural resources, oxygen can be removed by hydrodeoxygenation, decarboxylation and/or decarbonylation. These conversion processes typically require high pressure hydrotreatment equipment, similar to those used in fossil petroleum refineries. There is therefore the necessity of producing higher-quality components for diesel of a biological origin, and of consequently increasing the production of diesel of a biological origin, in short times, in particular using technologies which produce higher-quality components. New dedicated plants are therefore required for facing the necessity of increasing the production capacity of high-quality biological components.

US 2004/0230085 reports a process for producing a hydrocarbon component of biological origin, characterized in that the process comprises at least two steps, the first one of which is a hydrodeoxygenation step and the second one is an isomerisation step. The resulting products have low solidification points and high cetane number and can be used as diesel, cooling fluids or as solvent.

Bio-feedstock for use in steamcrackers need to comply with some technical specifications as the conventional existing steamcrackers are designed for hydrocarboneous feedstock, featured by additional specifications, like boiling point range, metal content and presence of oxygenates. A promising bio-feedstock for steam cracking are fatty acids from various origin like vegetable oils, animal greases, used cooking oils etc. WO 2011/012438 describes the performance of the direct use of fatty acids in a steamcracker, demonstrated good yields for light olefins. As the feedstock still contains some oxygen (in the carboxyl moiety), more carbonoxides (CO & $CO_2$) and some short chain water soluble acids are formed.

Existing steamcrackers are not designed to handle these carbonoxides or lower pH of the aqueous product. WO 2011/012439 claims a process to convert fatty acids and triglycerides into paraffin's, called bio-naphtha, free from substantial amounts of oxygen and that can be used for steam cracking. These paraffin's contain 12 to 24 carbons dependent on their origin and hence falling in the boiling range of fossil gasoil.

This need to remove the oxygen from natural resources requires additional investment in expensive equipment, often in an economic environment where fossil fuels are challenged by a reduced demand and expensive bio-feedstock compared to fossil equivalent and hence investments in grassroots' equipment is difficult to justify. Unused equipment in an existing refinery can be retrofitted for this purpose and produce optimum product compositions for fuel and steamcracker applications.

WO 2014033762 relates to a method for revamping a conventional refinery of mineral oils into a biorefinery, characterized by a production scheme which allows the treatment of natural oils for the production of biofuels. This method allows the re-use of existing plants, allowing, in particular, the revamping of a refinery containing a system comprising two hydrodesulfurization units into a biorefinery containing a production unit of hydrocarbon fractions from mixtures of fatty acid esters by means of hydrodeoxygenation and isomerization, wherein each of the hydrodesulfurization units: a hydrodesulfurization reactor, ($A_1$) for the unit $U_1$ and ($A_2$) for the unit $U_2$, wherein said reactor contains a hydrodesulfurization catalyst; one or more heat exchangers between the feedstock and effluent of the reactor; a heating system of the feedstock upstream of the reactor; an acid gas treatment unit downstream of the reactor, containing an absorbent (B) for $H_2S$, said unit being called $T_1$ in the unit $U_1$ and $T_2$ in the unit $U_2$, and wherein said method comprises: installing a line L between the units $U_1$ and $U_2$ which connects them in series; installing a recycling line of the product for the unit $U_1$ and possibly for the unit $U_2$, substituting the hydrodesulfurization catalyst in the reactor $A_1$ with a hydrodeoxygenation catalyst; substituting the hydrodesulfurization catalyst in the reactor $A_2$ with an isomerization catalyst; installing a by-pass line X of the acid gas treatment unit $T_2$ of the unit $U_2$; substituting the absorbent (B) in the acid gas treatment unit $T_1$ with a specific absorbent for $CO_2$ and $H_2S$.

US 2017/0298280 discloses a process for producing ethylene and propylene by steam cracking a mixture of non-cyclic paraffin comprising at least 90% of components having at least 12 carbon atoms with either a mixture of hydrocarbons having from 3 to 4 carbon atoms or a mixture of hydrocarbons comprising at least 90% of components having a boiling point ranging from 15° C. to 200° C.

US 2011/0319683 discloses the production of naphtha from a renewable feedstock via hydrotreating the renewable feedstock to produce a hydrotreating unit heavy fraction and hydrocracking such effluent.

WO 2015/128045 relates to an integrated hydrocracking process for the production of olefins and aromatics from an hydrocarbon feedstock comprising crude oil.

In order to obtain at the same time, most suitable renewable linear paraffin's for steam cracker applications there is a need to modify such a configuration.

SUMMARY OF THE INVENTION

According to a first aspect of the present invention, a process for the conversion of a feedstock comprising at least 50 wt % related to the total weight of the feedstock of triglycerides, fatty acid esters and/or fatty acids having at least 10 carbon atoms into hydrogen, olefins, dienes, aromatics, gasoline, diesel fuel, jet fuel, naphtha and liquefied petroleum gas is provided. The process comprises the steps of:

a) introducing of said feedstock in a first reactor to produce linear paraffins in presence of a hydrodesulfurization catalyst and hydrogen, b) separating the effluent of said first reactor in at least two parts to produce at least a first stream comprising part of said linear paraffins and at least a second stream comprising part of said linear paraffins, c) sending said first stream to a steam cracker to produce hydrogen, olefins, dienes, aromatics and gasoline, diesel fuel being further fractionated;

introducing said second stream into a second reactor in presence of a hydrocracking and/or hydroisomerization catalyst to produce a mixture comprising diesel fuel, jet fuel, naphtha and liquefied petroleum gas being further fractionated.

The present process can be done in existing equipment by retrofitting a fossil petroleum refinery. By putting at least 2 hydrotreatment units in series, one for hydrodeoxygenation and one for hydrocracking and/or hydroisomerization, allows to produce liquid biofuels, having suitable cold-flow properties. In particular, in the present process, said first and second reactors are existing units used in the retrofit of an existing plant. In a second aspect of the present invention, a bio-refinery is provided Said bio-refinery, comprises at least two reaction zones:

(a) the first reaction zone comprising: the feedstock, a first reactor comprising a plurality of catalytic beds containing an hydrodesulfurization catalyst, a heating system of the feedstock upstream of the first reactor, an acid gas treatment unit downstream of the first reactor comprising an hydrogen recycling system, and a fractionation unit suitable to separate the linear paraffins from the other non-condensable products and liquid aqueous phase issued from the first reactor, and comprising a pipe connecting the fractionation unit of the first reaction zone to a steam cracker and conveying part of the linear paraffins produced in the first reaction zone to said steam cracker;

(b) a pipe connecting the fractionation unit of the first reaction zone to a second reactor comprising a plurality of catalytic beds containing an linear paraffin's hydrocracking or hydro-isomerization catalyst, a heating system of the feedstock upstream of the second reactor, an acid gas treatment unit downstream of the second reactor comprising an hydrogen recycling system, and a fractionation unit suitable to separate the products from the second reactor, and liquefied petroleum gas and naphtha are recovered as top product of the fractionation unit, jet fuel is recovered as middle product of the fractionation unit and diesel is recovered as bottom product of the fractionation unit.

In a preferred embodiment said bio-refinery is remarkable in that a pipe is connecting the fractionation unit of the first reaction zone to the bottom product of the fractionation unit of the second reaction zone to make a mixture of diesel components.

DETAILED DESCRIPTION OF THE INVENTION

Figure 1:
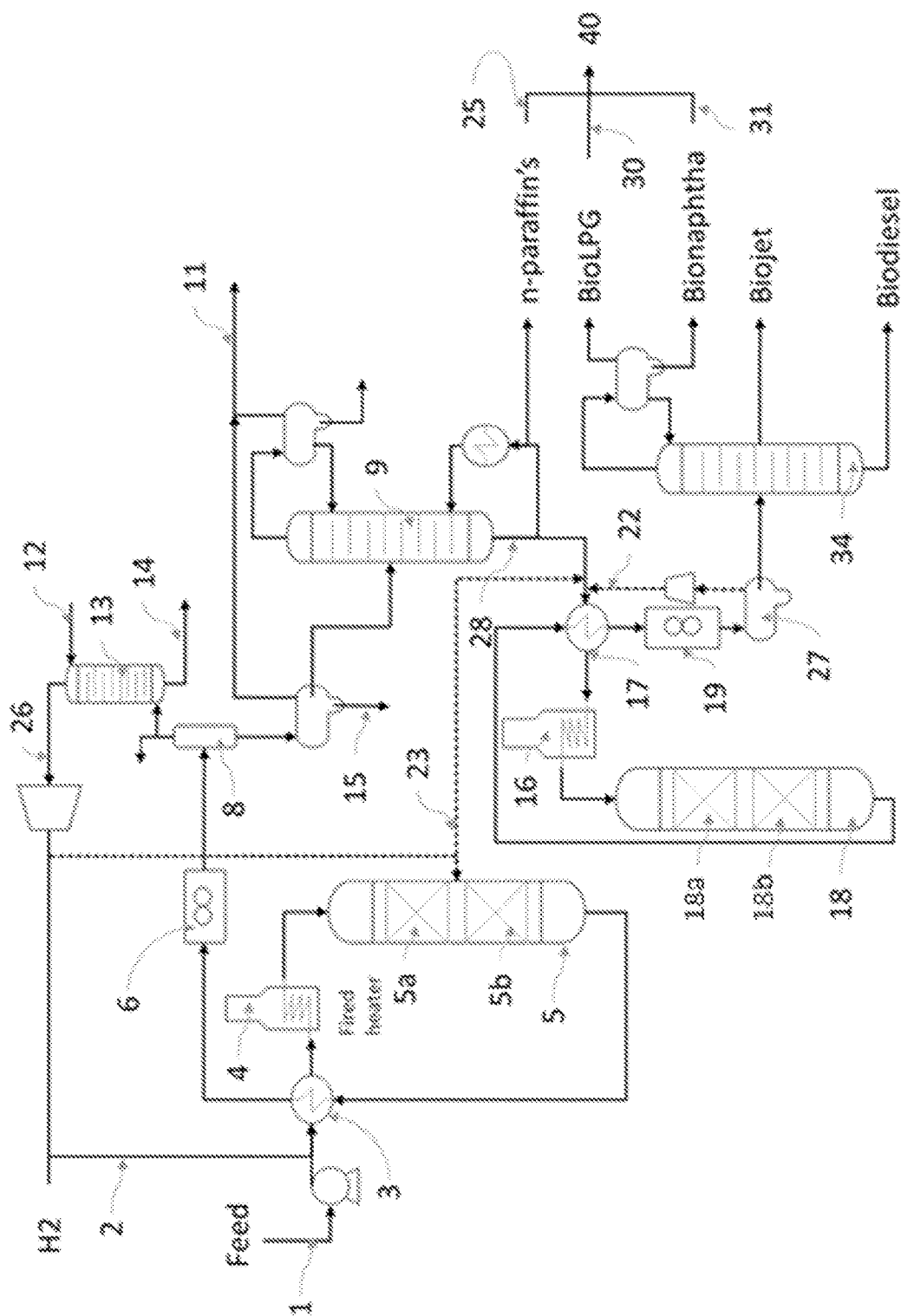
FIGS. 1 to 3 schematically represent units used to carry out the process according to various particular embodiments of the present invention.

According to a first aspect of the present invention, a process for the conversion of a feedstock comprising at least 50 wt % related to the total weight of the feedstock of triglycerides, fatty acid esters and/or fatty acids having at least 10 carbon atoms into hydrogen, olefins, dienes, aromatics, gasoline, diesel fuel, jet fuel, naphtha and liquefied petroleum gas is provided. The process comprising the step of:

a) introducing of said feedstock in a first reactor to produce linear paraffins in presence of a hydrodesulfurization catalyst and hydrogen, b) separating the effluent of said first reactor in at least two parts to produce at least a first stream comprising part of said linear paraffins and at least a second stream comprising part of said linear paraffins, c) sending said first stream to a steam cracker to produce hydrogen, olefins, dienes, aromatics and gasoline, diesel fuel being further fractionated;

d) introducing said second stream into a second reactor in presence of a hydrocracking and/or hydroisomerization catalyst to produce a mixture comprising diesel fuel, jet fuel, naphtha and liquefied petroleum gas being further fractionated.

In view of the construction of new plants, which requires lengthy times and high investments, above all for the reactors, that must operate at a high hydrogen pressure, compressors and other machines and for the construction of a hydrogen production plant, the necessity is strongly felt for finding alternative solutions which allow the exploitation of existing production units by converting of existing plants, with the least possible invasiveness and as economically as possible. Therefore, in the present process, said first and second reactors are existing unit used in the retrofit of an existing plant.

A method has been found for transforming hydrodesulfurization units into conversion units of mixtures of a biological origin, based on triglycerides, fatty acids or fatty acid esters, into bio-components for fuels, in particular for diesel and possibly jet fuel, LPG and naphtha or gasoline: the new method is based on appropriate variations in the configuration of units already existing with the selection of equipments that can be converted rather than grassroots (greenfield) built and a limited number of substitutions and new installations. This method is of particular interest within the current economic context which envisages a reduction in the demand for oil products and refinery margins, allowing the production cycle to be modified through the transformation of already-existing hydrodesulfurization units in oil refineries into production units of hydrocarbon mixtures that can be used as fuels from mixtures of a biological origin.

This conversion of mixtures of a biological origin into bio-components consists in the production of hydrocarbon fractions from mixtures of a biological origin containing triglycerides, fatty acids or fatty acid esters, by means of their hydrodeoxygenation and hydrocracking and/or hydroisomerization. The process therefore allows the production of a plurality of fractions containing linear paraffins, LPG, naphtha, jet fuel or diesel, starting from a mixture of a biological origin containing fatty acid esters, and possibly containing free fatty acids.

LPG is liquefied petroleum gas and consists essentially of propane and butanes with some corresponding olefins. Naphtha are typically $C_5$ to $C_{10}$ range hydrocarbons in the boiling range of 30-200° C. as determined by the true boiling point (TBP) distillation method according to ASTM Test Method D2892. Jet fuel, aviation fuel or kerosene are typically $C_6$ to $C_{15}$ hydrocarbons in the boiling range of 150-275° C. as determined by the true boiling point (TBP) distillation method according to ASTM Test Method D2892. Diesel fuel are typically $C_8$ and $C_{22}$ hydrocarbons in the boiling range of 200-350° C. as determined by the true boiling point (TBP) distillation method according to ASTM Test Method D2892. Gasoline has similar hydrocarbon number as naphtha i.e. $C_5$ to $C_{10}$ although it might contain some lighter components like butanes and some heavier hydrocarbons up to $C_{12}$ as well, but the essential difference is that it has to reach a high enough octane number in combustion engine applications.

Triglycerides, fatty acid esters and/or fatty acids have a natural origin and can be qualified as natural occurring oil. A natural occurring oil is defined as an oil of biomass origin, and do not contain or consist of any mineral oil.

The natural occurring oil(s) can be selected among vegetable oils, animal fats, preferentially inedible highly saturated oils, waste oils, by-products of the refining of vegetable oil(s) or of animal oil(s) containing free fatty acids, tall oils, oils produced by bacteria, yeast, algae, prokaryotes or eukaryotes, and mixtures thereof.

In one embodiment, such natural occurring oil(s) may contain 50 w % or more of fatty acid esters and/or free fatty acids, preferably 60 wt % or more, most preferably 70 wt % or more.

In one embodiment, such natural occurring oil(s) may contain fatty acids esters and free fatty acids, containing one to three saturated or unsaturated ($C_{10}$-$C_{24}$) acyl-groups. When several acyl groups are present, they may be the same and different.

Suitable vegetable oils are for example palm oil, palm kernels oil, soy oils, soybean oil, rapeseed (colza or canola) oil, sunflower oil, linseed oil, rice bran oil, maize (corn) oil, olive oil, castor oil, sesame oil, pine oil, peanut oil, castor oil, mustard oil, palm kernel oil, hempseed oil, coconut oil, babasu oil, cottonseed oil, linola oil, jatropha oil.

Animal fats include tallow, lard, grease (yellow and brown grease), fish oil/fat, butterfat, milk fats.

The vegetable/animal oils (or fats) can be used crude, without any treatment after their recovery by any of the usual well known extraction methods, including chemical extraction (such as solvent extraction), supercritical fluid extraction, steam distillation and mechanical extraction (such as crushing).

By-products of the refining of vegetable oils or animal oils are by-products containing free fatty acids that are removed from the crude fats and oils by neutralisation or vacuum or steam distillation. Typical example is PFAD (palm free acid distillate).

Waste oils include waste cooking oils (waste food oil) and oils recovered from residual water, such as trap and drain greases/oils, gutter oils, sewage oils, for example from water purification plants.

Tall oils, including crude tall oils, distillate tall oils (DTO) and tall oil fatty acids (TOFA), preferably DTO and TOFA, can also be used in the present invention.

Tall oil, or otherwise known as tallol, is a liquid by-product of the Kraft process for processing wood, for isolating on the one hand the wood pulp useful in the papermaking industry, and on the other hand tall oil. Tall oil is essentially obtained when conifers are used in the Kraft process. After treating wood chips with sodium sulfide in aqueous solution, the tall oil isolated is alkaline. The latter is then acidified with sulfuric acid to produce crude tall oil.

Crude tall oil mainly comprises rosins (which contains resin acids, mainly cyclic abietic acid isomers), fatty acids (mainly palmitic acid, oleic acid and linoleic acid) and fatty alcohols, and unsaponifiable compounds in particular unsaponifiable sterols (5-10 wt %), sterols, and other hydrocarbons.

Insufficient acidification can lead to a crude tall oil containing metal salts, generally of sodium.

By fractional distillation of crude tall oil, tall oil fatty acids (TOFA) and distilled tall oil (DTO) can be recovered. DTO contains a mixture of fatty acids and resin acids and is a fraction heavier than TOFA fraction but lighter than tall oil pitch, which is the residue of the crude oil distillation. TOFA fraction consists mostly of $C_{18}$ fatty acids. TOFA fraction may need to be purified to contain a rosin content to 1-10 wt %.

The natural occurring oil(s) used in the present invention also include oils produced by microorganisms, either natural or genetically modified microorganisms, such as bacteria, yeast, algae, prokaryotes or eukaryotes. In particular such oils can be recovered by mechanical or chemical extraction well known methods.

The above oils contain variable amounts of non-triglyceride components such as free fatty acids, mono and diglycerides, and many other organic and inorganic components including phosphatides, sterols, tocopherols, tocotrienols hydrocarbons, pigments (gossypol, chlorophyll), vitamins (carotenoids), sterols glucosides, glycolipids, protein fragments, traces of pesticides and traces metals, as well as resinous and mucilaginous materials.

All the above described natural occurring oils can be treated in the process of the invention. In a preferred embodiment, the process is further remarkable in that said feedstock comprises at least 25 wt %, preferably 50 wt %, more preferably 75 wt %, even more preferably 90 wt % of triglycerides, fatty acid esters and/or fatty acids related to the total weight of the feedstock.

In the present process, in the first reactor the hydrodeoxygenation step is carried out in the presence of hydrogen and a catalyst containing a carrier and one or more metals selected from metals of group VIII and group VIB. Preferably the catalysts are previously sulfided, by means of the known techniques. In order to keep the catalyst in sulfided form, the sulfiding agent, for example thiophenic compounds, dimethyldisulfide, H2S or hydrogendisulfide, is fed continuously, simultaneously with the liquid feedstock, in an amount ranging from 10 to 5000 wppm sulfur, more preferably from 40 to 2000 and most preferably from 60 to 1000 wppm. The catalyst may be selected among Ni, Mo, W, Co or mixtures like NiW, NiMo, CoMo, NiCoW, NiCoMo, NiMoW and CoMoW oxides or sulphides as catalytic phase, preferably supported on high surface area carbon, alumina, silica, titania, zirconia or mixture thereof. Such catalysts are commonly known as hydrodesulfurization (removal of organic sulfur compounds) catalyst used in hydrotreatment unit and desulfurization units in a petroleum refinery. Such catalysts have the ability also to hydrodenitrogenate (removal of organic nitrogen compounds) and to hydrodeoxygenate (removal of organic oxygen compounds) organic molecules containing respectively nitrogen or oxygen.

The hydrodeoxygenation step is normally done at a pressure ranging from 10 to 100 bar and at a temperature ranging from 200 to 500° C.

In the present process, the mixture of a biological origin can be subjected to a pretreatment before being fed to the hydrodeoxygenationstep, wherein said pretreatment can be effected by adsorption, treatment with ion exchange resins or mild acid washings. In a preferred embodiment, said fatty acids may be obtained by physical refining, including steam distillation or vacuum distillation, of fats and oils, or said fatty acids are obtained by hydrolysis of triglycerides of fats and oils, or said fatty acids are obtained by acidulation of soaps; preferably said soaps being obtained by saponification of fats and oils or by the chemical refining, including neutralization of free fatty acids, present in the fats and oils, or neutralization of fatty acids obtained from hydrolysis of the fats and oils.

The mixture resulting from the hydrodeoxygenation step and which is subjected to hydrocracking and/or hydroisomerization may be subjected to a purification treatment prior to said hydrocracking and/or hydroisomerization. The purification treatment comprises a separation step and a washing step, in particular the mixture resulting from hydrodeoxygenation step can be sent to a high-pressure gas-liquid separator in order to recover a gaseous phase and a liquid phase.

The gaseous phase, containing hydrogen, water, CO, $CO_2$, methane, light paraffins ($C_3$) and small quantities of $NH_3$ and $H_2S$, is cooled: upon condensation, the water and condensable hydrocarbons are separated, and the remaining gaseous phase is purified to obtain hydrogen that can be recycled to the hydrodeoxygenation reaction step. The liquid phase separated in the high-pressure separator, composed of a hydrocarbon fraction, essentially consisting of linear paraffins with a number of carbon atoms ranging from 9 to 24, is partly fed to the subsequent hydrocracking and/or hydroisomerization step.

Hydrogen used in step a) may be supplied from a naphtha reformer, steam cracker or steam methane reformer. Advantageously, the hydrogen originates from the steam cracker used in the step c) of the process.

The hydrocracking and/or hydroisomerization step can be carried out at a temperature ranging from 200 to 500° C., and a pressure ranging from 20 to 150 bar.

Hydroisomerization or hydrocracking catalysts that can be conveniently used are catalysts containing metals of group VIII-X, and a carrier selected, for example, among alumina oxide or silica or silico-aluminas or zeolites and mixtures thereof. The metal of group VIII-X is preferably noble metals like Pt, Pd and mixtures of Pt and Pd or base metals like Ni, W, Co or Mo and mixtures thereof. In case of base metals the catalyst can optionally be sulfided by using dimethyldisulfide or hydrogensulfide.

The operating conditions, catalysts and preferred particular embodiment aspects of the hydrodeoxygenation and hydrocracking and/or hydroisomerization process are known to experts in the field.

In a preferred embodiment, the process is remarkable in that in step c) the sum of hydrogen, ethylene, propylene, butadiene and benzene produced on said steam cracker originating from said first stream is at least 60 wt % preferably at least 65 wt % of the converted first stream.

In a preferred embodiment, the process is further remarkable in that said triglycerides, fatty acids esters and/or fatty acids contained in the feedstock are obtained by at least one of the following purification steps:

Chemical refining, physical refining, including degumming, bleaching, steam distillation or vacuum distillation, of fats and oils, or hydrolysis of triglycerides of fats and oils, to obtain glycerol and a mixture of free fatty acids.

In another preferred embodiment of the present invention, naphtha or liquefied petroleum gas (propane and butanes) or mixture thereof produced in step d) can be mixed with said first stream of step c) before steam cracking is carried out.

In another preferred embodiment of the present invention, the naphtha or liquefied petroleum gas produced in step d) and linear paraffin's of the first stream produced in step c) or mixture thereof can be mixed with another hydrocarbon feedstocks of mineral origin before steam cracking is carried out.

In a particular embodiment of the present invention, the present process comprises the step of:
a) introducing of said feedstock in a first reactor to produce linear paraffins in presence of a hydrodesulfurization catalyst and hydrogen,
b) the separation of the effluent of said first reactor in three parts to produce a first, a second and a third stream, each comprising parts of said linear paraffins produced in step a),
c) sending the first stream to a steam cracker to produce hydrogen, olefins, dienes, aromatics and gasoline, diesel fuel being further fractionated;,
d) introducing the second stream into a second reactor in presence of a hydrocracking and/or hydroisomerization catalyst to produce a mixture comprising branched paraffins, diesel fuel, jet fuel, naphtha and liquefied petroleum gas being further fractionated,
e) blending the third stream comprising mainly linear paraffins with the naphtha produced in step d).

In particular, the feedstock used in the present process may comprise a straight run diesel fuel which is introduced in said first reactor.

A straight run diesel fuel is a diesel fuel obtained straight after the atmospheric distillation without being further hydrodesulfurized. A straight run diesel fuel contains at least 5 wt % of sulphur. The presence of sulphur has the advantage that less sulfiding agent is required at the inlet of the first reactor. The straight run diesel fuel plays at least partially the role of sulfiding agent.

Preferably, the feedstock may comprise triglycerides, fatty acid esters, and/or fatty acids together with straight run diesel fuel and:

step a) produces linear paraffins, propane and desulfurized diesel fuel that are separated into a said first stream comprising propane and part of said linear paraffins, and into said second stream comprising desulfurized diesel fuel and part of said linear paraffins.

In a preferred embodiment, the first and second reactors contain a plurality of catalytic beds comprising a catalyst; in particular the first reactor comprises a hydrodesulfurization catalyst and the second reactor comprises a hydrocracking and/or hydroisomerization catalyst as defined above. Each reactor may comprise 2, 3, 4, 5, or more catalytic beds. In particular, a cold quench gas or liquid is injected between said catalytic beds in order to control the temperature in the catalyst beds.

In a preferred embodiment, the process is remarkable in that said feedstock of said first reactor is diluted in order to limit the temperature increase within said first reactor; and wherein before entering the first reactor said dilution is performed with a weight ratio diluent:feedstock being 1:1, preferably 2:1 even more preferably 4:1; and wherein said diluent comprises at least part of said paraffins obtained at step b) and/or of said diesel fuel obtained at step d) or any mixture thereof.

In preferred embodiment, the process is further remarkable in that the first reactor contains a plurality of catalytic beds comprising the hydrodesulfurization catalyst and wherein between said catalytic beds part of the feedstock of said first reactor and/or hydrogen containing gas or any mixture thereof are injected in order to reduce the temperature of the effluent of upper catalytic bed of at least 5° C. before entering the following catalytic bed.

In a preferred embodiment, the process is further remarkable in that the first reactor contains a plurality of catalytic beds comprising the hydrodesulfurization catalyst and wherein between said catalytic beds part of the paraffins obtained at step b) or part of the diesel fuel obtained at step d) or any mixture thereof are injected in order to reduce the temperature of the effluent of upper catalytic bed of at least 5° C. before entering the following catalytic bed.

Preferably, the feedstock is heated upstream to said first reactor. The linear paraffins produced within the first reactor may be purified and separated in two or more fractions. A first fraction may be used and convey through a steam cracker. Another fraction may be used as feedstock for the second reactor. The linear paraffins used as feedstock for the second reactor may be heated upstream of said second reactor.

The products of the second reactor are fractionated and at least naphtha, diesel and liquefied petroleum gas are separated. Jet fuel may also be obtained from the fractionation.

Hydrocracking-Hydroisomerisation of the Paraffins

All or part of said first stream of step b) can be submitted to a hycrocracking—hydro isomerisation reaction in presence of dihydrogen and of at least one catalyst to obtain an effluent and fractionating said effluent into dihydrogen, non-condensable hydrocarbons, LPG, naphtha, Jet fuel and diesel fractions.

The liquid portion obtained from the hydroprocessing step comprises a hydrocarbon fraction are consisting essentially all of n-paraffins and having about 9 to about 24 carbon atoms.

A portion of this hydrocarbon fraction, after separation, may be used as the hydrocarbon recycle to the deoxygenation section in order to absorb reaction heat, to dilute the deteriorating effect of remaining impurities or to bring more dihydrogen as dissolved dihydrogen to the deoxygenation section.

Although this hydrocarbon fraction is useful as a diesel fuel, because it comprises high cetane n-paraffins, it will have poor cold flow properties. If it is desired to improve the cold flow properties of the liquid hydrocarbon fraction, then the reaction product can be hydro isomerized under isomerization conditions to at least partially isomerize the n-paraffins to isoparaffins or if it is desired to produce more naphtha like or jet fuel like hydrocarbons, then the reaction product can be hydrocracked under hydrocracking conditions to at least crack partially the n-paraffins into shorter carbon chain n-paraffins and isoparaffins.

The Suitable hydrocracking and/or hydro isomerisation catalysts used in hydrocracking and/or hydro isomerisation processes are all of the bifunctional type combining an acid function with a (de)hydrogenating function.

The acid function is supplied by a carrier (amorphous or crystalline), the surface areas of which are generally in the range from 100 to 700 m2 per gram and have surface acidity, such as halogenated (in particular sulphated, phosphatated, chlorinated or fluorinated) aluminas (eventually containing some boron), amorphous silica-aluminas, amorphous silica-alumina-titania, sulphated zirconia's, tungstated zirconia's and Zeolites or a mixture thereof. The acidity can be measured by methods well known to the skilled person. It can, for example, be made by temperature programmed desorption (TPD) with ammonia, by infrared measurement of absorbed molecules (pyridine, CO . . . ), by a catalytic cracking test or by hydroconversion using a model molecule.

The (de)hydrogenating function is supplied either by one or more metals of group VIB of the periodic table of the elements, or by a combination of at least one metal of group VIB of the periodic table and at least one group VIII metal.

The distance between the two functions, acid and (de) hydrogenating, is one of the key parameters governing the activity and selectivity of the catalyst.

A weak acid function and a strong hydrogenating function give catalysts of low activity, generally requiring high temperature (greater than or equal to 390-400° C.), and long residence times or at a low hourly space velocity (VHSV LHSV expressed in liquid volume of feed to be treated per unit volume of catalyst and per hour is generally less than or equal to 2), but have very good selectivity for middle distillates (jet fuels and diesel fuels). In general, the term "middle distillates" as used in this invention is applied to fraction(s) with an initial boiling point of at least 150° C. and an end point of generally up to 340° C., about 350° C., preferably less than 370°C. or 380° C.

Conversely, a strong acid function and a weak hydrogenating function give catalysts that are active, but have poorer selectivity for middle distillates and result is more cracked hydrocarbons in the range of naphtha and jet fuels.

One type of conventional hydrocracking catalyst is based on amorphous carriers that are moderately acidic, such as silica-aluminas for example. These systems are used for maximizing middle distillates of good cold-flow properties. Such catalyst maximized hydro isomerisation over hydrocracking.

Catalysts and conditions for hydrocracking and hydro isomerization are well known in the art.

If isomerization is desired, the hydrocarbons of the deoxygenation section are contacted with an isomerization catalyst in the presence of dihydrogen at isomerization conditions to isomerize the normal paraffins to branched paraffins. The cracking or isomerization of the paraffinic product can be accomplished in any manner known in the art or by using any suitable catalyst known in the art.

The acidic carrier material may be amorphous or crystalline. Suitable support materials include amorphous alumina, amorphous silica-alumina, amorphous silica-borate, amorphous silica-alumina-titania, zeolites or modified zeolites having the following structures like ferrierite, zeolite beta, zeolite Y, zeolite mordenite and molecular sieves of the type ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-38, ZSM-48, ZSM-50, ZSM-57, theta-1, EU-1, EU-13, ISI-1, KZ-2, ISI-4 and KZ-1, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, each of which may be used alone or in combination.

When hydrocracking needs to be promoted, catalysts comprising zeolites for example Zeolite Y of the structural type FAU might be selected having catalytic activity that is greater than that of silica-aluminas, but have lower selectivity for middle distillates or maintaining the number of carbons constant. This difference is attributed to the difference in strength of the acid sites. As explained above the distance between the (de)hydrogenation function and the acid sites is important to optimize the synergy between the two catalytic functions. As the pore size of zeolites in imposed by the crystalline structure and in the order to 4 to 13 angstrom diffusion limitation of reactants towards the acid site and the diffusion of reaction products away from the acid sites might impact the selectivity. Introducing mesopores into the zeolite has been reported to improve selectivity to middle distillates. Introducing mesopores is well known in the art and can be carried out by acid or alkali treatments.

The production of the bifunctional hydrocracking and/or hydro isomerisation catalyst can be carried out by any method known in the art. The (de)hydrogenation function can be added to the acidic carrier by impregnation of metal-containing solutions, by ion-exchange and mixing.

The hydrocracking and hydro isomerisation steps can be carried out using one or several types of catalysts in a plurality (one or more) of catalyst beds in the same reactor or in a plurality of different reactors. The feedstock to the hydrocracking and/or hydroisomerisation can be sent over the catalyst simultaneously with the dihydrogen-containing gases in a down flow mode, in an up flow mode or the liquid feedstock can flow in down flow while the dihydrogen-containing gases flow in up flow mode through the catalyst beds.

Hydrocracking and/or hydro isomerization conditions include a temperature of about 150° C. to about 500° C. or more preferable of about 220° C. to about 450° C. and most preferable of 250 to about 420° C. and a pressure of about 1 MPa to about 15 MPa or more preferable of about 1.5 MPa to about 9 MPa and most preferred of about 2 MPa to about 6 MPa. The hourly space velocity is about 0.1 to 20 h−1, more preferably 0.2 to 10 h−1 and most preferably 0.3 to 4 h−1. The supplied dihydrogen-containing gases are introduced simultaneously with the feedstock at a ratio of 75 to 2500 Nl (H2)/l of liquid feedstock, more preferably of 150 to 1500 or most preferably of 250 to 1000.

The hydrocracking and/or hydro isomerisation of the hydrocarbons coming from the deoxygenation section can be carried out with the same catalyst while the operating temperature allows to control the extent of cracking relative to isomerization.

In case a large flexibility between isomerisation and cracking is desired the preferred catalysts are non-zeolitic in nature. When a high degree of cracked products (like naphtha and jet fuels) are desired a zeolitic catalyst is recommended.

Means to control the degree of hydrocracking versus hydro isomerisation are (i) the proper selection of the catalyst, (ii) controlling the temperature of the catalyst, (iii) controlling the hourly space velocity and (iv) controlling the dihydrogen to liquid feedstock ration.

Other indirect means to control the relative ratio of hydrocracking and hydro isomerisation by influencing the above mentioned parameters is by optimizing the quenching of the reactor content, Often quenching is applied in order to control the temperature rise during exothermic hydrocracking. By quenching more with either additional cold dihydrogen and by cold fresh feedstock or cold recycle stream a lower average catalyst bed temperature can be controlled. Still another way to control the degree of hydrocracked products is to recycle non-cracked product effluent after separation of the desired reaction products back to the inlet of the hydrocracking and/or hydro isomerisation reactor.

Steamcracking of the Paraffins

All or part of the first stream of step b) can be fed to a steam cracker unit.

Steam crackers are complex industrial facilities that can be divided into three main zones, each of which has several types of equipment with very specific functions: (i) the hot zone including: pyrolysis or cracking furnaces, quench exchanger and quench loop, the columns of the hot separation train, (ii) the compression zone including: a cracked gas compressor, purification and separation columns, dryers and (iii) the cold zone including: the cold box, de-methaniser, fractionating columns of the cold separation train, the C2 and C3 converters, the gasoline hydrostabilization reactor. Hydrocarbon cracking is carried out in tubular reactors in direct-fired heaters (furnaces). Various tube sizes and configurations can be used, such as coiled tube, U-tube, or straight tube layouts. Tube diameters range from 1 to 4 inches, Each furnace consists of a convection zone in which the waste heat is recovered to raise steam as dilution steam or as utility for the plant and to preheat the feedstock and a radiant zone in which pyrolysis takes place. The feedstock mixture is preheated in the convection zone to about 300-650° C. or the feedstock is preheated in the convection section and subsequently mixed with dilution steam before it flows over to the radiant zone, where pyrolysis takes place at coil outlet temperatures varying from 800 to 900° C. and residence times from 0.01 to 1 second as detailed above, depending on the feedstock type and the cracking severity desired. In the case of a naphtha steam cracker the coil outlet temperature is of at least 820° C. with a steam to hydrocarbon ratio of 0.6 whereas in the case of a gasoil the steam to hydrocarbon ratio has to be increased or the temperature has to be decreased to avoid a too rapid coking. As mentioned above, in an advantageous embodiment, the residence time is from 0.05 to 0.5 seconds, preferably from 0.1 to 0.4 seconds. The steam/feedstock mixture weight ratio preferentially ranges from 0.25 to 0.5 7 kg/kg, preferably from 0.30 to 0.45 6 kg/kg, more preferably is of 0.35 to 0.4 kg/kg. For steam cracking furnaces, the severity can be modulated by: temperature, residence time and partial pressure of hydrocarbons. The coil outlet pressure may range from 750 to 950 mbars, preferably from 800 to 900 mbars, more preferably may be approx. 850 mbars. The residence time of the feed in the coil and the temperature are to be considered together. Rate of coke formation will determine maximum acceptable severity. A lower operating pressure results in easier light olefins formation and reduced coke formation. The lowest pressure possible is accomplished by (i) maintaining the output pressure of the coils as close as possible to atmospheric pressure at the suction of the cracked gas compressor, (ii) reducing the pressure of the hydrocarbons by dilution with steam (which has a substantial influence on slowing down coke formation). The steam/feedstock ratio may be maintained at a level sufficient to limit coke formation.

Effluent from the pyrolysis furnaces contains unreacted feedstock, desired olefins (mainly ethylene and propylene), dihydrogen, methane, a mixture of C4's (primarily isobutylene and butadiene), pyrolysis gasoline (aromatics in the C6 to C8 range), ethane, propane, di-olefins (acetylene, methyl acetylene, propadiene), and heavier hydrocarbons that boil in the temperature range of fuel oil (pyrolysis fuel oil).

The term "biorefinery" refers to a complex of industrial plants in which products and raw materials of a biological origin, such as, for example, vegetable oils, animal fats, used cooking oils, are treated, to obtain fuels. The fuels thus obtained are generally indicated as biofuels.

In a second aspect of the present invention, a biorefinery containing a production unit comprising at least two reaction zones is provided. The first reaction zone comprises: A pipe conveying the feedstock to a first reactor, the first reactor can comprise a plurality of catalytic beds containing a hydrodesulfurization catalyst, and a heating system of the feedstock upstream of the first reactor. The first reaction zone may also comprise an acid gas treatment unit downstream of the first reactor comprising a hydrogen recycling system. A fractionation unit suitable to separate the linear paraffins from the other products issued from the first reactor may also be contained within the first reaction zone. One or more heat exchangers may be provided between feedstock and effluent. The acid gas treatment unit downstream of the first reactor preferably contains a specific absorbent for $H_2S$. As known by experts of the field, the hydrodesulfurization reactor is normally made of low-bound carbon steel (for example 1 ½ Cr-½ Mo, 2 ¾ Cr-1 Mo) with respect to the reactor jacket, with a stainless steel internal lining of the type 321 SS, 347 SS. The reactor interiors are generally made of stainless steel of the type 321 SS, according to what is suggested by the standard API 941-2004. The hydrodesulfurization reactors that can be used and their configurations are well-known to experts in the field and—are described for example in the art.

The heat exchanger of the feedstock-effluent exchange train used in a desulfurization unit are preferably made of low-bound carbon steel (1 Cr-¾ Mo) with possible inner coating of stainless steel (347 SS) or totally of stainless steel (347Ss, 321 SS), for high-temperature feedstock-effluent exchangers, whereas it is made of simple or work-hardened carbon steel (CS or KCS) for exchangers operating at lower temperatures. These exchangers allow heat exchange between feedstock to the reactor and its effluent. Heating systems, situated upstream of the hydrodesulfurization reactor and operating over the feedstock to the reactor can be selected from direct fired ovens and heat exchangers. An oven comprising a radiating section and possibly a convective section is preferably used.

The description of heating systems, and in particular ovens and their configurations and production suitable for hydrodesulfurization units can be found in the art.

Acid gas treatment units suitable for being used in hydrodesulfurization units, their configurations and specific absorbents for the absorption of $H_2S$ are well-known to experts in the field.

Absorbents which can be used are, for example, solvents, preferably of the alkanol-amine type, for example MDEA (methyl-diethanol-amine) or DEA (diethanolamine).

One or more sulfur recovery units which may be used in the method of the present invention, are also normally present in refineries, as will be described in more detail hereunder: said sulfur recovery units are well-known to experts in the field and comprise a primary sulfur recovery section, of the Claus type, and possibly a tail-gas treatment section suitable for increasing the conversion to sulfur. In particular, a sulfur recovery unit of the Claus type is composed of a first thermal reaction step, consisting of the furnace in which the acid gas is burnt at temperatures higher than 1500° C. and where the Claus reaction takes place $(3H_2S+(3/2)O_2 => 3S+3H_2O)$, which converts about 70% by weight of the sulfur at the inlet of the unit, followed by a catalytic section, consisting of two or more catalytic reactors, containing an alumina bed, where part of the non-reacted $H_2S$ is converted to elemental sulfur, alternated by an intermediate cooling suitable for condensing the sulfur produced. A Claus unit thus formed reaches a recovery of about 96-98% by weight of the sulfur at the inlet. Said Claus unit and the catalysts used therein are well-known to experts in the field.

The second reaction zone may comprise a pipe connecting the fractionation unit of the first reaction zone to a steam cracker and conveying part of the linear paraffins produced in the first reaction zone to said steam cracker, a second reactor comprising a plurality of catalytic beds containing an linear paraffin's hydrocracking and/or hydroisomerization catalyst, a heating system of the feedstock upstream of the second reactor, an acid gas treatment unit downstream of the second reactor comprising an hydrogen recycling system, and a fractionation unit suitable to separate the products from the second reactor, and liquefied petroleum gas and naphtha are recovered as top product of the fractionation unit, jet fuel is recovered as middle product of the fractionation unit and diesel is recovered as bottom product of the fractionation unit.

In a preferred embodiment, the pipe connecting the fractionation unit of the first reaction zone to a steam cracker and conveying part of the linear paraffins produced in the first reaction zone to said steamcracker is further connected to the pipe by which the bottom product of the fractionation unit of the second reaction zone is extracted thereof.

Preferably a pipe is connecting the fractionation unit of the first reaction zone to the inlet of the first reactor of the first reaction zone and recycles liquid paraffins to dilute the feedstock to the first reaction zone. Preferably this recycle liquid paraffins can be saturated with dissolved hydrogen to convey more hydrogen to the first reaction zone.

Preferably, a pipe is connected to the first reactor of the first reaction zone and conveys a cold quench liquid between two catalytic beds of said first reactor. Preferably this quench liquid paraffins can be saturated with dissolved hydrogen to convey more hydrogen between two catalytic beds of said the first reaction zone.

The heating system of the feedstock and the heat exchanger between feedstock and effluent are preferably different from each other.

The first and second reaction zones also preferably contain hydrogen recycling lines, and compressors, which connect the acid gas treatment units which are situated downstream of the reactors, with the same reactors: said lines, and compressors, are reused for the same purpose in the production unit of hydrocarbon fractions from mixtures of a biological origin obtained by the revamping method of the present invention.

A further preferable aspect of the present invention is to install a surge drum (S) upstream of each of the first and second reactors. The first reaction zone can contain, in addition to what has already been described above:

a line for feeding make-up hydrogen possibly after mixing it with recycled hydrogen, to the first reactor, wherein said line can derive for example from the refinery hydrogen network or directly from a naphtha reforming unit, a steam methane reformer or a steamcracker.

A surge drum (S) can be additionally inserted upstream to the first reactor used for the hydrodeoxygenation step and upstream to the second reactor used for the isomerization step: said drum has the purpose of equalizing the feedstock, consisting of fresh feedstock plus reacted recycled product.

As previously specified, each of said hydrodesulfurization units to which the method of the present invention is applied, contains preferably an acid gas treatment unit normally operating downstream of a high-pressure separator, situated on the reactor effluent, whose function is to purify the hydrogen leaving the reactor, by separation the $H_2S$ formed during the hydrodeoxygenation, before said hydrogen is recycled. Furthermore, the desulfurization unit normally contains a low-pressure separator from which fuel gas (FG) is separated, containing methane, ethane and $H_2S$, whereas the liquid fraction is sent to a stripping column, suitable for separating LPG and naphtha overhead and desulfurized gas oil at the bottom of the column. A vacuum dryer is normally inserted on the line of the desulfurized product for removing possible traces of water present in the product, before sending it to storage.

As previously described, said high- and low-pressure separators, said stripping column and said possible dryer remain preferably unvaried, they do not undergo any changes or modifications due to the transformation method of the present invention and are re-used as such, thus also being able to be a part of the production unit of hydrocarbon fractions from mixtures of a biological origin containing fatty acid esters or fatty acids by means of their hydrodeoxygenation and cracking or isomerization, as said unit results after application of the transformation method of the present invention.

In the configuration deriving from the method of the present invention, as the first reactor upstream of said acid gas separation unit is used for the hydrodeoxygenation of mixtures containing fatty acid esters and fatty acids, the gaseous by-product from which the hydrogen is to be purified before being recycled to the first or the second reaction zone, is mainly $CO_2$, mixed with smaller quantities of $H_2S$, due to the requirement of having a minimum presence of sulfurization agent to maintain the catalytic activity of the hydrodesulfurization catalyst stable. Due to the different nature of the gases leaving the hydrodeoxygenation reactor for which the acid gas treatment unit was designed according to the method of the present invention, the absorbent used in the acid gas treatment unit should be substituted: the gas leaving the reactor mainly contains non-condensable hydrocarbons, $H_2$, $H_2S$, CO and $CO_2$, with a molar ratio of $CO_2/H_2S$ higher than 1 most of the time higher than 10., whereas in pre-existing hydrodesulfurization case, the gas leaving the reactor mainly contained $H_2$ and $H_2S$ while only traces of $CO_2$, with a high content of $H_2S$, resulting from the sulfur content of the mineral hydrocarbon material fed to the refinery.

The acid gas treatment unit therefore preferably contains an absorbent that remove simultaneously $H_2S$ and $CO_2$ in order to avoid a built of such component with the recycle of hydrogen back to the inlet of the first or second reaction zone. Depending on the amount of $H_2S$ produced and the amount of minimum sulfur required to maintain the catalytic activity stable, several options exist.

In case when the feedstock or the hydrogen containing gas contains enough sulfur to keep the catalyst stable, a absorption solvent can be selected that captures both acid gases simultaneously under appropriate conditions and such acid gases can be disposed of after regeneration of the solvent allowing recycling the non-converted hydrogen to the inlet of the first or second reaction zone.

In case when the feedstock or the hydrogen containing gas contains not enough sulfur to keep the catalyst stable, a absorption solvent can be selected that captures both acid gases simultaneously under appropriate conditions and such acid gases can be disposed of after regeneration allowing recycling the non-converted hydrogen to the inlet of the first or second reaction zone. In this case a make-up of sulfurization agent can be injected with the feedstock or hydrogen containing gas to keep the catalytic activity stable.

In case when the feedstock or the hydrogen containing gas contains not enough sulfur to keep the catalyst stable, a discriminating absorption solvent can be selected that captures first selectively $H_2S$ under selective operating conditions, followed by an second absorption solvent capturing $CO_2$ under appropriate conditions allowing recycling the non-converted hydrogen to the inlet of the first or second reaction zone. The acid gas treatment unit therefore contains an absorbent specific for $H_2S$, normally a selective amine for $H_2S$. The solvent rich in sulfur can be regenerated separately and the produced $H_2S$ recycled to the inlet of the first or second reaction zone in order to keep the catalytic activity stable. The solvent rich in $CO_2$ can be regenerated separately and the produced $CO_2$ disposed of. The separate absorption of $H_2S$ and $CO_2$ can be carried out with the same solvent but applying discriminating conditions or can be carried out with different solvents that discriminative for $H_2S$ and $CO_2$.

In case when the feedstock or the hydrogen containing gas contains not enough sulfur to keep the catalyst stable, a absorption solvent can be selected that captures both acid gases simultaneously under appropriate conditions allowing recycling the non-converted hydrogen to the inlet of the first or second reaction zone. The solvent rich in sulfur and $CO_2$ can be regenerated selectively under selective conditions to first desorb the $CO_2$ under appropriate operating conditions and the produced $CO_2$ disposed of followed by desorption of the $H_2S$ and the produced $H_2S$ recycled to the inlet of the first or second reaction zone in order to keep the catalytic activity stable.

In case when the feedstock or the hydrogen containing gas contains not enough sulfur to keep the catalyst stable, a absorption solvent can be selected that captures both acid gases simultaneously under appropriate conditions and such acid gases can be desorbed by regeneration of the rich solvent allowing recycling the non-converted hydrogen to the inlet of the first or second reaction zone. The acid gases containing both $CO_2$ and $H_2S$ is sent to a second selective acid gas treatment unit using a selective solvent for $H_2S$ capturing while the $CO_2$ can be disposed of. The selective rich solvent is regenerated by desorption of the $H_2S$ and the produced $H_2S$ recycled to the inlet of the first or second reaction zone in order to keep the catalytic activity stable.

The varying nature, composition and flow-rate of the gases leaving the first reactor can be processed in the pre-existing acid gas treatment unit by simple substitution of the pre-existing absorbent suitable for the absorption of $H_2S$ with a selective absorbent for both $CO_2$ and $H_2S$.

Absorbents suitable for the absorption of $CO_2$ and $H_2S$, in the proportions indicated above, and which can be used in the method of the present invention, are well-known to experts in the field. Industrially important alkanol amines for this operation are mono ethanol amine (MEA), di-ethanol amine (DEA), di-isopropanol amine (DIPA) and N-methyldiethanol amine (MDEA) or DGA (diglycolamine). Sterically-hindered amine system or tertiary amine that have no hydrogen attached to the nitrogen have generally superior selectivity for $H_2S$ According to a preferred aspect, amines available on the market, produced by DOW and BASF, are used, and preferably methyldiethanolamine (MDEA) with promoters or activated. Said amines are described, for example, in U.S. Pat. No. 6,337,059. Amines suitable for being used in the present invention, produced by DOW, are, for example, those of the series UCARSOL™ AP, such as, for example, AP802, AP804, AP806, AP810 and AP 814, and preferably UCARSOL™ AP Solvent 810.

The mixture of $CO_2$ and $H_2S$ is recovered from said absorbents by regeneration of the absorbent, particularly in the case of an amine solvent, in a re-boiled distillation column, operating at low pressure.

A particularly preferred aspect relates to a method according to the present invention, additionally operating so as to recycle the $H_2S$ in the outlet of the hydrodeoxygenation step, after recovering it from the absorbent. In the hydrodeoxygenation step, $CO_2$ is also formed by decarboxylation of the fatty acid esters or fatty acids.

As further described hereunder, in order to separate the $H_2S$, the mixture of $CO_2$ and $H_2S$ formed during the hydrodeoxygenation step must be recovered from the absorbent and, after separating the $H_2S$ from the $CO_2$, by means of two additional absorption/regeneration steps, carried out in a further acid gas treatment unit, the resulting stream of $H_2S$ from the hydrodeoxygenation section is recycled, as sulfiding agent of the catalyst of the first reactor, preferably sending it to the compressor of the hydrogen recycling line of the first reaction zone by means of a new line installed for this purpose which is connected to the suction of said compressor.

The hydrogen necessary for the production unit of hydrocarbon fractions from mixtures of a biological origin, containing triglycerides, fatty acid esters or fatty acids, by means of their hydrodeoxygenation and hydrocracking and/or hydroisomerization, comprises preferably recycled hydrogen and a flow of make-up hydrogen, preferably mixed with recycled hydrogen and fed to the first and second reactors: said make-up hydrogen can be supplied, as previously indicated, by reforming units normally already present in refineries. In particular, heavy naphtha (TBP 80-160° C. measured using ASTM Test Method D2892) can be fed to a catalytic reforming unit.

The reforming reaction conditions differ depending on the type of unit installed: for semi-regenerative reforming units, the operating pressure is 16-28 barg with a Platinum-Rhenium catalyst and a H/C ratio of <4; for continuous new-generation reforming units, the operating pressure is 2.5-5 barg with a Platinum-Tin catalyst and a H/C <3; the desired product is the reformate, a gasoline base with a high octane number (98-101), with the simultaneous formation of $H_2$.

Natural gas, fuel gas, LPG or virgin naphtha are fed to the steam reforming unit; the steam reforming reaction takes place with a nickel catalyst on alumina at high temperatures 750-900° C. and an operating pressure of 20-40 barg. The desired product is $H_2$.

The hydrogen deriving from reforming can then be fed to the first and second reactors by means of pre-existing lines or specific lines installed for the purpose, and possibly after purification and concentration of the hydrogen flow by means of a PSA (pressure swing adsorption) system. This configuration allows a separate and autonomous hydrogen feed to be obtained for each reactor, thus improving the flexibility and operability of the plants. This aspect represents an improvement with respect to normal hydrodeoxygenation processes of vegetable oils, which envisages a single hydrogen circuit for the two reactors. The PSA system, when present, uses for example a series of beds filled with adsorbent material, typically a zeolite. The stream of gas rich in hydrogen flows through the bed, the gaseous products are adsorbed and, as hydrogen has a lesser tendency to be adsorbed, a flow of pure hydrogen is obtained at the outlet of the PSA unit. The regeneration of the adsorbing bed must be cyclically effected by depressurization.

FIG. 1 represents a biorefinery according to a particular embodiment of the present invention. The feedstock 1 comprising fatty acids esters or free fatty acids is mixed with hydrogen containing gas 2 and heated in the feed/effluent heat exchanger 3 and in the heating system 4 (which might be a heating furnace or a heat exchanger fed by superheated steam) before entering the first reactor 5 comprising multiple catalytic beds (here only two 5a, 5b, are shown) comprising hydrodesulfurization catalysts. The products from the first reactor are cooled via the feed/effluent heat exchanger 3 and the cooler 6 and separated in the flash drum 8. The hydrocarbon fractions containing linear paraffins are conveyed to the fractionation unit 9. The gas resulting from the hydrodeoxygenation reaction in the first reactor 5 are purified in the absorption unit 13 by a lean absorbing agent introduced therein via the inlet 12. The product obtained at the bottom outlet of the absorption unit 13 via line 14 is a rich absorbing agent. Hydrogen extracted at the top outlet of the absorption unit is recycled via recycling line 26. Prior to the fractionation of the linear paraffins in 9, said linear paraffins are purified to remove impurity. Sour water 15 and sour gas 11 are obtained. The linear paraffins isolated from the fractionation unit 9 are separated. Parts of the linear paraffin are sent to steam cracking in 30 via the pipe 25. The remaining linear paraffins are used as feedstock for the second reactor 18 having catalytic beds 18a and 18b) wherein hydrocracking and/or hydroisomerization is carried out. The remaining linear paraffins are conveyed to the second reactor 18 via the pipe 28 heated in the feed/effluent heat exchanger 17 and in the heating system 16 (which might be a heating furnace or a heat exchanger fed by superheated steam). The linear paraffins are mixed with hydrogen containing gas provided by the line 23 and heated prior introduction thereof in the second reactor 18. The products obtained at the outlet of the second reactor are cooled in the feed/effluent heat exchanger 17 the cooling device 19 and flashed in 27 prior to fractionation which takes place in the fractionation unit 34. During the purification, hydrogen can be recovered and recycled through the recycling line 22. The fractionation unit 34 allows the separation of biodiesel as bottom product, bio jet as middle product and LPG and naphtha as top product. LPG and naphtha are purified and sent optionally to the steam cracker 40 via pipe 30 and pipe 31.

Figure 2:
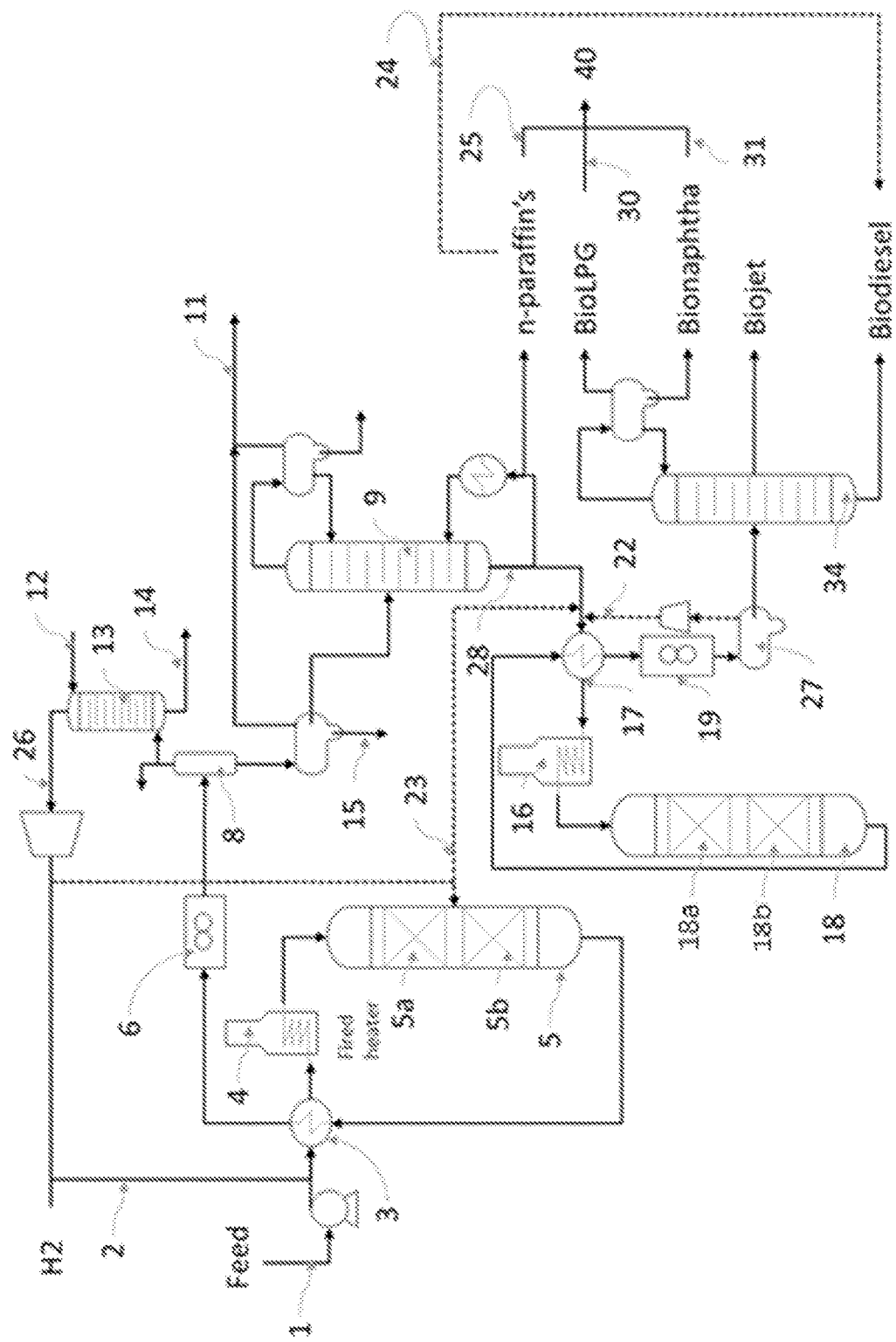

In a particular embodiment, the linear paraffins obtained as product of the fractionation unit 9 is mixed with hydrocracked or hydroisomerised biodiesel obtained as bottom product of the fractionation unit 34 via pipe 24 in order to optimize the diesel properties as there are cetane number and cold-flow properties. This is illustrated in FIG. 2.

Figure 3:
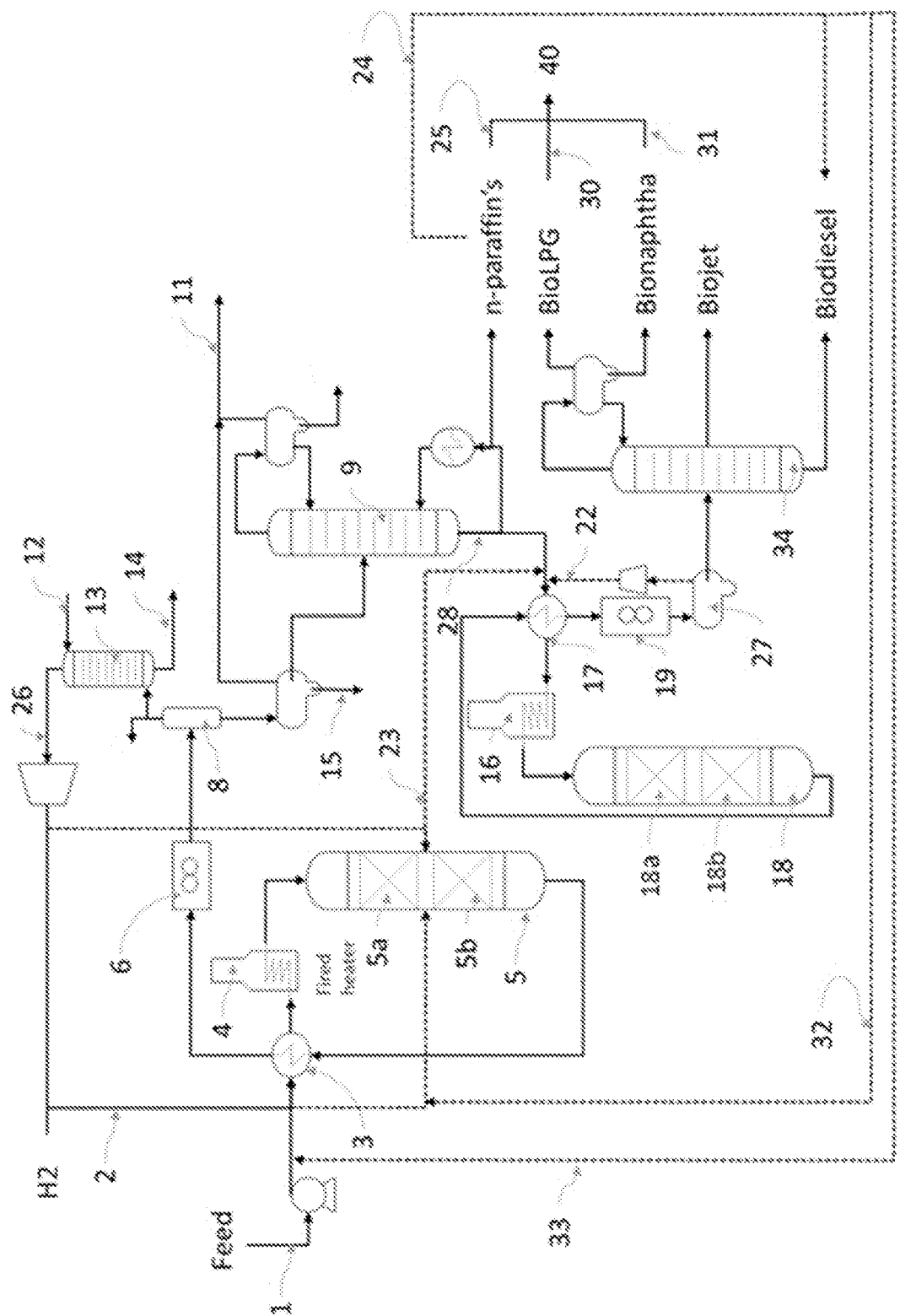

In a particular embodiment, a cold quench liquid feedstock is introduced in the first reactor 5 between two catalytic beds via the pipe 26 in order to better control the temperature across the catalytic beds as the hydrodeoxygenation is a very exothermic reaction. This is illustrated in FIG. 3. Optionally cold quench hydrogen or cold quench linear paraffins used as diluent and produced as bottom product of the fractionator 9 are introduced in the first reactor 5 between two catalytic beds via the pipe 32 in order to better control the temperature across the catalytic beds as the hydrodeoxygenation is a very exothermic reaction.

Optionally, linear paraffins produced as bottom product of the fractionator 9 can be mixed with the feedstock via pipe 33 to dilute the feedstock in order to better control the temperature across the catalyst beds as the hydrodeoxygenation is a very exothermic reaction.

The invention claimed is:

1. A process for the conversion of a feedstock comprising at least 50 wt % related to the total weight of the feedstock of triglycerides, fatty acid esters and/or fatty acids having at least 10 carbon atoms into hydrogen, olefins, dienes, aromatics, gasoline, diesel fuel, jet fuel, naphtha and liquefied petroleum gas comprising:
   a) introducing the feedstock in a first reactor to produce linear paraffins in presence of a hydrodesulfurization catalyst and hydrogen;
   b) separating the linear paraffins produced by the first reactor in at least three parts to produce at least a first stream comprising part of the linear paraffins, a second stream comprising part of the linear paraffins, and third stream comprising part of the linear paraffins;
   c) sending the first stream to a steam cracker to produce hydrogen, olefins, dienes, aromatics and gasoline;
   d) introducing the second stream into a second reactor in presence of a hydrocracking or hydro-isomerization catalyst to produce a mixture comprising diesel fuel, jet fuel, naphtha and liquefied petroleum gas; and
   e) blending the third stream with the diesel fuel obtained at the step d),
wherein the feedstock of the first reactor is diluted in order to limit the temperature increase within the first reactor; and wherein before entering the first reactor the dilution is performed with a weight ratio diluent : feedstock being 1:1 to 4:1, and wherein the diluent comprises at least part of the paraffins obtained at step b).

2. The process according to claim 1 wherein the first and second reactors are existing units and wherein the process is obtained from the retrofit of an existing plant.

3. The process according to claim 1 wherein the feedstock comprises at least 75 wt % of triglycerides, fatty acid esters and/or fatty acids related to the total weight of the feedstock.

4. The process according to claim 1 wherein hydrogen used in step a) is supplied from a naphtha reformer, the steam cracker of step c), or a steam methane reformer.

5. The process according to claim 1 wherein in step c) a sum of hydrogen, ethylene, propylene, butadiene and benzene produced from the steam cracker is at least 60 wt % of the first stream converted in the steam cracker.

6. The process according to claim 1 wherein the naphtha or liquefied petroleum gas or any mixture thereof produced in step d) are mixed with the first stream of step c) before being sent to the steam cracker of step c).

7. The process according to claim 1 wherein the triglycerides, fatty acids esters and/or fatty acids contained in the feedstock are obtained by at least one of the following purification steps:
   chemical refining or physical refining, of fats and oils, or
   hydrolysis of triglycerides of fats and oils, to obtain glycerol and a mixture of free fatty acids.

8. The process according to claim 1 wherein the hydrodesulfurization catalyst comprises Ni, Mo, W, or Co, or mixtures, metal oxides, or metal sulphides thereof.

9. The process according to claim 1 wherein the dilution of feedstock to limit the temperature increase within the first reactor is performed with a weight ratio diluent : feedstock being 2:1.

10. The process according to claim 1 wherein the first reactor contains a plurality of catalytic beds comprising the hydrodesulfurization catalyst and wherein between the catalytic beds part of the feedstock of the first reactor and/or hydrogen containing gas or any mixture thereof are injected in order to control temperature across the plurality of catalytic beds.

11. The process according to claim 1 wherein the first reactor contains a plurality of catalytic beds comprising the hydrodesulfurization catalyst and wherein between the catalytic beds part of the paraffins obtained at step b) are injected in order to control temperature across the plurality of catalytic beds.

12. The process according to claim 1 wherein the feedstock is heated upstream of the first reactor and the linear paraffins of the second stream are heated upstream of the second reactor.

13. The process according to claim 7, wherein the chemical refining or physical refining of fats and oils comprises degumming, bleaching, steam distillation, or vacuum distillation.

14. The process according to claim 8, wherein the mixtures of Ni, Mo, W, or Co comprise NiW, NiMo, CoMo, NiCoW, NiCoMo, NiMoW, or CoMoW.

* * * * *